United States Patent [19]

Bertling et al.

[11] Patent Number: 4,860,636
[45] Date of Patent: Aug. 29, 1989

[54] BRAKE BOOSTER FOR VEHICLES

[75] Inventors: Hannes Bertling, Vaihingen/Enz; Robert Mergenthaler, Markgroningen; Edgar Schmitt, Vaihingen/Enz; Heinz Siegel, Stuttgart, all of Fed. Rep. of Germany

[73] Assignee: Robert Bosch GmbH, Stuttgart, Fed. Rep. of Germany

[21] Appl. No.: 186,875

[22] Filed: Apr. 27, 1988

[30] Foreign Application Priority Data

May 9, 1987 [DE] Fed. Rep. of Germany ....... 3715569

[51] Int. Cl.⁴ .............................................. F15B 9/10
[52] U.S. Cl. ..................... 91/376 R; 251/86
[58] Field of Search ............. 91/358, 368, 374, 376 R, 91/422; 60/547.1, 593; 251/84, 86

[56] References Cited

U.S. PATENT DOCUMENTS

| 2,698,205 | 7/1954 | Gager | 303/54 |
|---|---|---|---|
| 2,840,336 | 6/1958 | Suthann | 251/86 X |
| 3,182,443 | 5/1965 | Hermanns | 91/368 |
| 3,691,903 | 9/1972 | Shellhause | 91/376 R X |
| 3,707,112 | 12/1972 | Ewald | 91/376 R |
| 3,834,277 | 9/1974 | Yabuta et al. | 91/376 R |
| 3,951,043 | 4/1976 | Keady | 91/376 R X |
| 4,014,171 | 3/1977 | Kobashi | 91/376 R X |
| 4,022,111 | 5/1977 | Taft | 91/376 R X |
| 4,337,686 | 7/1982 | Ohta | 91/374 X |
| 4,514,981 | 5/1985 | Brown et al. | 251/86 X |
| 4,665,701 | 5/1987 | Bach | 60/547.1 |
| 4,685,297 | 8/1987 | Brown, Jr. | 60/547.1 |

Primary Examiner—Robert E. Garrett
Assistant Examiner—Mark A. Williamson
Attorney, Agent, or Firm—Edwin E. Greigg

[57] ABSTRACT

A brake booster having a brake valve disposed inside a booster piston, the brake valve comprises a valve bushing including a valve seat and a slide that is pressed by a spring against the valve seat of the valve bushing. The slide is supported with play at a great distance from the valve seat, so that it can be pivoted slightly around the vicinity of its bearing. The pivotability of the slide facilitates its centering in the valve seat, so that the valve closes dependably even in the presence of bearing tolerances or valve seat tolerances. Seals required for sealing off the slide have an elastic behavior, and are disposed in the vicinity of the bearing. As a result, reliable sealing is assured despite the pivotability of the slide.

5 Claims, 2 Drawing Sheets

BRAKE BOOSTER FOR VEHICLES

BACKGROUND OF THE INVENTION

The invention relates to a brake booster for vehicles. To increase the braking action in motor vehicles, brake boosters disposed between the brake pedal and the brake system are provided. Their task is to amplify the force fed to the pedal. Known brake boosters include a brake valve that is opened via the brake pedal and as a result causes a medium that is under pressure to act upon a booster piston, which in turn generates a braking force. A slide used in these brake valves is typically supported at least two points. Because of machining tolerances, the slide may not be located centrally with respect to the valve seat embodied as its counterpart, and therefore must be pressed into the valve seat by a sufficiently great spring force to prevent leakage.

OBJECT AND SUMMARY OF THE INVENTION

If the slide is supported with adequate play in a sheath, then the valve cone can easily center itself in the valve seat of the brake valve. It is advantageous for the slide to be spaced relatively far apart from the valve seat, because then the long lever arm is such that small alignment forces are sufficient to center the valve cone in the valve seat. In a further feature of the invention, a two-part slide is used, in which two bearing points are unconnected to one another, so that the two parts can move slightly toward one another in an articulated manner. This facilitates centering of the valve cone, which is formed onto the face end of one of the two parts. In both embodiments, the spring forces can be decreased, which in turn lessens the actuation forces. Moreover, simple parts that can be inexpensively manufactured are used.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
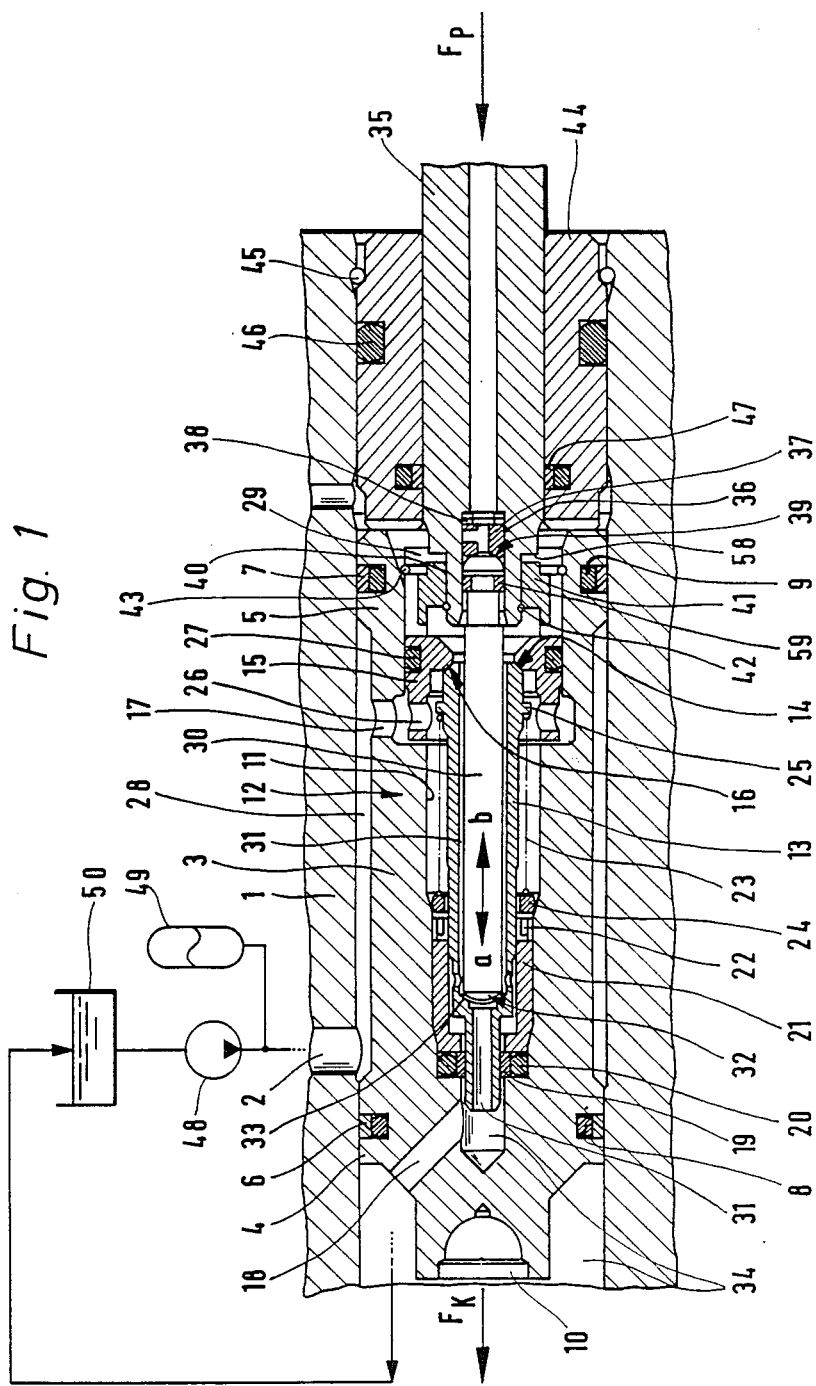
FIG. 1 shows a brake booster according to the invention.

In a housing 1 shown in FIG. 1 and having a bore 2 for introducing a hydraulic fluid, a booster piston 3 is displaceably supported. The booster piston 3 is provided with two collars 4, 5 on its circumference, the collar 5 being slightly larger in diameter than the collar 4. For receiving seals 6, 7, two annular grooves 8, 9 are provided on the collars 4, 5. A hemispherical recess 10 is provided on the face end of the booster piston 3, serving to receive one end of a bolt, not shown, which is connected to the master brake cylinder, not shown. The booster piston 3 has a stepped axial bore 11, which serves to receive the brake valve 12. The brake valve 12 substantially comprises a slide 13, having a valve cone 14 formed onto its end face, and a valve bushing 15 having a valve seat 16 which cooperates with the end face to form a valve. A radial bore 17 is provided in the booster piston 3, for supplying the brake valve 12 with hydraulic fluid. A diagonal bore 18 at the end of valve 12 serves as a return conduit. For sealing off the slide 13 at its inner end, a static seal 19, encompassed on its outside diameter by a dynamic seal 20, is introduced into a stepped bore 11. Both seals are retained in the axial direction with the face end of a sheath 21, which surrounds the slide, in which the slide 13 is supported with slight play. A seal 22, which likewise serves to seal off the slide 13, is disposed on the other face end of the sheath. The valve cone 14 of the slide 13 is pressed into the valve bushing onto the valve seat 16 of the valve bushing 15 by a spring 23, which is supported on a disk 24 at one end and on an annular step 25 formed onto the slide 13 near the valve seat. The valve bushing 15 has a transverse bore 26, which serves as a passageway for the hydraulic fluid, and the bushing is sealed off at its circumference by a static seal 27. The valve cone 14 and valve bushing 15 form an outer valve, which allows the pressurized hydraulic fluid from a pressure chamber 28 surrounding the booster piston toward the brake pedal end of the booster to enter a work chamber 29. For opening this valve, a pressure bar 30 movable in an axial bore in the slide 13 is provided, which is movably supported at one end, with slight play, in a bore 36 of the pedal tappet 35. Toward the pedal tappet 35, the pressure bar 30 is sealed off with a static seal 59. The face end 32 of the pressure bar 30 that is located in the axial bore of slide 13 has a spherical surface, which together with an oblique step 33 of the stepped axial through bore 31 forms an inner valve that in this position is open. The inner valve allows the hydraulic fluid to leave the work chamber 29 via axial bore 31 and enter a pressure-free chamber 34 at the master cylinder end of the booster piston. The portion of the pressure bar that protrudes from the slide 13 leads to a pedal tappet 35, which is connected with a brake pedal, not shown. The bore 36 in the pedal tappet 35, into which a support element 37 and shims 38 are inserted is located at the face end of the pedal tappet 35. The end of the pressure bar 30 is likewise inserted into the bore 36, where it is supported with its other, also spherical, face end 39 on the support element 37. A pressure ring 41 is slipped onto a smaller diameter end extension 40 embodied in the manner of a tang on this end of the pedal tappet 35 and is retained in the axial direction on the pedal tappet 35 with a snap ring 42 and in the booster piston with a further snap ring 43. The pedal tappet 35 is supported in a guide bushing 44, which is axially retained in the housing 1 with a snap ring 45. The guide bushing 44 is sealed off toward the housing by a static seal 46 and toward the pedal tappet 36 by a dynamic seal 47. A pump 48 having a pressure reservoir 49 and a non-pressurized reservoir 50 serves to supply the entire apparatus with hydraulic fluid.

The mode of operation of the brake booster brake valve according to the invention is as follows:

Upon actuation of a brake pedal, not shown, a force $F_p$ is fed in at the pedal tappet 35 and moves the pedal tappet in the direction a. The pressure bar 30, which is supported via the support element 37 and the shims 38 on the pedal tappet 35, is likewise moved in direction a, so that its face end 32 strikes the oblique step 33 and moves the slide 13 along with it in the direction a. In this process, the inner valve 32, 33 is closed and the outer valve 14, 16 is simultaneously opened. The pump 48, with its pressure reservoir 49, pumps the hydraulic fluid at an overpressure into the work chamber 29 via valve 14, 16 which is increasing in size. The pressure prevailing in the pressure chamber 28 builds up in the work chamber 29 as well, acts upon the booster piston 3, and moves the booster piston in the direction a. At the same time, the hydraulic fluid located in the chamber 34 is fed back into the reservoir 50 by movement of the booster piston 3. A bolt (not shown), which is supported by one end in the hemispherical recess 10 on the face end of the booster piston 3, transmits the force generated, $F_K$, to the master brake cylinder. The motion of the booster piston 3 lasts until such time as the valve seat 16, of the valve bushing 15 moving along in the booster piston 3, again rests on the valve cone 14 of the slide 13, and the outer valve is thereby closed. Whenever the brake pedal is actuated again, the process is repeated. When the brake pedal is released, the pedal tappet 35 and the pressure bar 30 move in the direction b, whereupon the face end 32 of the pressure bar 30 is lifted from the step 33. This opens the inner valve, while the outer valve remains closed. The pressure prevailing in the work chamber 29 is reduced via the opened valve 32, 33 and the through bore 31 to the pressure-free chamber 34. The continuously prevailing overpressure in the pressure chamber 28 has the effect that a restoring force that moves the entire booster piston 3 in the direction b engages the differential surface area resulting from the slightly larger diameter of the collar 5. The hydraulic fluid located in the work chamber 29 can flow via the through bore 31 in the slide 13 and the opened inner valve 32, 33 to reach the chamber 34 via bore 18 in the booster piston. The booster piston 3 moves until such time as the inner valve is opened. Once the step 33 is again resting on the face end 32 of the pressure bar, the outflow of hydraulic fluid from the work chamber 29 is interrupted, and the booster piston 3 comes to a stop. Not until the brake pedal is fully released does the booster piston 3 return to its outset position, while the inner valve remains open. If there is a pressure loss in the chamber 28, the apparatus remains functional even though with reduced braking action. In this case, when the brake pedal is actuated, the pedal tappet 35, with the step 58, strikes the face end of the pressure ring 41. This ring in turn transmits the force $F_p$ fed to the pedal tappet to the master brake cylinder, via the valve bushing 15, the booster piston 3 and the bolt that is not shown.

Because the slide 13 is supported with sufficient play in the sheath 21 and because of the relatively great spacing of the bearing from the valve seat 16, the slide 13 has a slight pivotability about the vicinity of the bearing points, which facilitates the closure of the valve cone 14 on the valve seat 16. As a result, the valve cone 14 can be introduced accurately onto the valve seat 16 with relatively little spring force, even in the presence of bearing tolerances or valve seat tolerances.

Figure 2:
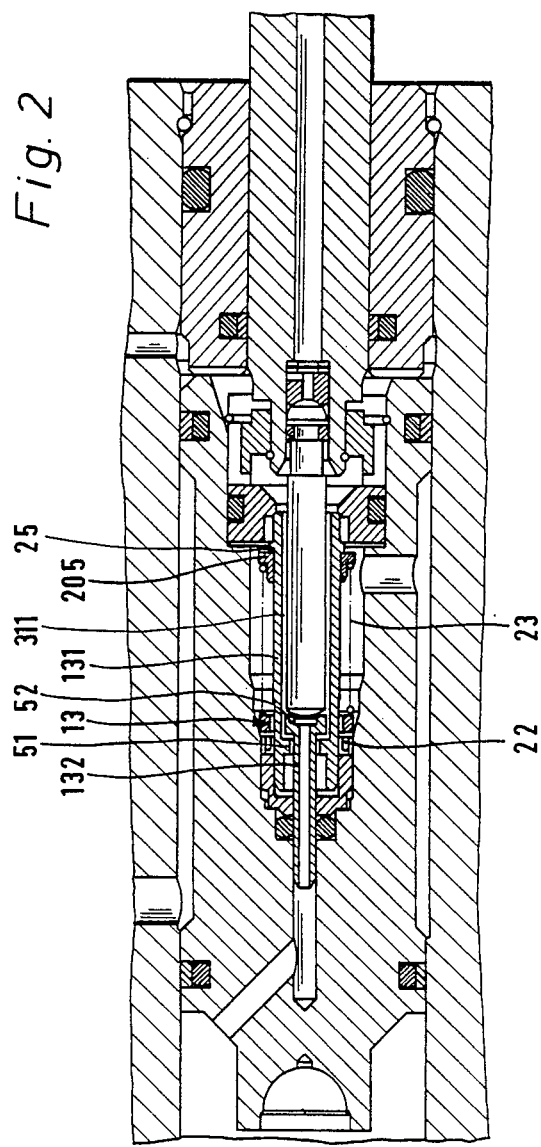
FIG. 2 shows a further embodiment of a brake booster according to the invention.
Figure 4:
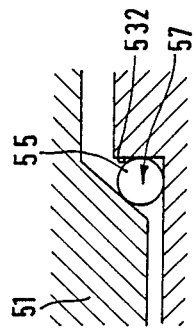
FIG. 4 is an enlarged detail of a further embodiment in the vicinity of the bearing surfaces.
Figure 3:
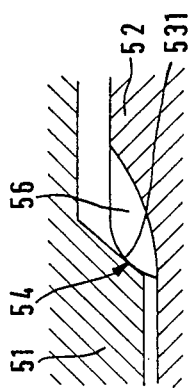
FIG. 3 is an enlarged detail of FIG. 2 in the vicinity of the bearing surfaces.

The version of a brake booster shown in FIG. 2 differs from that of FIG. 1 substantially in having a slide 13 made in two parts, an outer part 131 and an inner part 132. An inwardly directed collar 51 is formed in the through bore 311 of the outer part 131. The inner part 132 is likewise provided with a collar 52, on its outside diameter, and is passed with sufficient existing play through the outer part 131. Here, as shown in FIG. 3, the spherically embodied face end 531 of the collar 52 rests on the conically embodied face end 54 of the collar 51. In a variant shown in FIG. 4, a snap ring 55 is inserted, which is supported between the conical face end 54 and a face end 532, which here is embodied as straight. The two-part slide 13 of FIG. 3 is once again supported with some play in the sheath 21. Together with the existing play between the outer part 131 and inner part 132, this allows the two parts to pivot slightly with respect to one another about the contact point of the face ends 54 and 52 or 51 and 532. The seal 22 required for sealing off the slide is disposed at the level of the contact point. The equalization of pressure of the seal 22 required when the apparatus is in operation is attained either by means of a groove 56 in the collar 52, as shown in FIG. 3, or in the variant of FIG. 4 by a gap 57 in the snap ring 55. The annular step 25 is also embodied smaller, so that the spring 23 is no longer supported on it directly, but rather via a support ring 205. Disposing the bore 17 differently in the booster piston 3 allows the transverse bore in the valve bushing to be omitted. These differences are not critical in the functioning of the brake valve, which is the same as that described in conjunction with FIG. 1.

By embodying the slide 13 in two parts and supporting it with play in the sheath 21, once again a slight pivotability of the slide 13 is attained, which enables centering of the valve cone 14 in the valve 16 with little spring force.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. A brake booster comprising a brake booster piston (3), a stepped bore (11) in said brake booster piston, a slide (13) in said stepped bore of said brake booster piston, a bushing (15) within said bore of said brake booster piston, a valve seat (16) on said bushing, said slide (13) includes a valve cone (14) on one end that in a position of repose is pressed against the valve seat (16) of said bushing to form a first brake valve, a spring (23) that forces said valve cone of said slide against said valve seat, a bore (31) in said slide, said bore including an oblique step that forms a second valve face (33), a pressure bar (30) movable within said bore (31), said pressure bar including a face end (32) that, together with said second valve face (33), forms a second valve, said second valve is supportedly spaced far apart from said first valve seat (14) and includes seals (20, 22) on the circumference of said slide (13) that have an elastic behavior.

2. A brake booster comprising a brake booster piston (3), a stepped bore (11) in said brake booster piston, a slide (13) including two parts pivotally connected to one another in said stepped bore of said brake booster piston, a bushing (15) within said bore of said brake booster piston, a valve seat (16) on said bushing, said slide (13) includes a valve cone (14) on one end that in a position of repose is pressed against the valve seat (16) of said bushing to form a brake valve, a spring 23 that force said valve cone of said slide against said valve seat, said slide (13) is supportedly spaced far apart from said valve seat (16) with play in the vicinity of a bearing on at least one of said two parts, and seals (20, 22) on the circumference of said slide (13) that have an elastic behavior.

3. A brake booster as defined by claim 2, in which at least one of said two parts of said slide (13) is embodied as a sheath, one of said two parts being passed with play through said other part, and that said parts rest on one another in an axial direction with bearing surfaces formed as a collar (52) on an outside diameter of one of said parts, and by a collar (51) on an inside diameter of said other part.

4. A brake booster as defined by claim 3, in which a bearing surface (531) of one part has a shape of a spherical cross section, which enables an articulated motion of said two parts relative to one another.

5. A brake booster as defined by claim 3, in which a snap ring (55) is inserted between adjacent stop faces of said two parts resulting in an articulated connection of said two parts.

* * * * *